US012478556B2

(12) United States Patent
Cheng et al.

(10) Patent No.: US 12,478,556 B2
(45) **Date of Patent: *Nov. 25, 2025**

(54) VIAL ADAPTER

(71) Applicant: CareFusion 303, Inc., San Diego, CA (US)

(72) Inventors: Marco Cheng, Tustin, CA (US); Jonathan Yeh, Brea, CA (US); Soon Park, Cypress, CA (US)

(73) Assignee: CAREFUSION 303, INC., San Diego, CA (US)

( * ) Notice: Subject to any disclaimer, the term of this patent is extended or adjusted under 35 U.S.C. 154(b) by 1023 days.

This patent is subject to a terminal disclaimer.

(21) Appl. No.: 17/508,744

(22) Filed: Oct. 22, 2021

(65) Prior Publication Data

US 2022/0040041 A1 Feb. 10, 2022

Related U.S. Application Data

(63) Continuation of application No. 16/383,314, filed on Apr. 12, 2019, now Pat. No. 11,154,458, which is a (Continued)

(51) Int. Cl.
*A61J 1/20* (2006.01)

(52) U.S. Cl.
CPC ........... *A61J 1/2082* (2015.05); *A61J 1/2003* (2015.05); *A61J 1/2096* (2013.01); *A61J 1/201* (2015.05);
(Continued)

(58) Field of Classification Search
CPC ........ A61J 1/201; A61J 1/2096; A61J 1/2072; A61J 1/2075; A61J 1/2037; A61J 1/2082; A61J 1/2003
See application file for complete search history.

(56) References Cited

U.S. PATENT DOCUMENTS 7,743,799 B2 6/2010 Mosler et al.
8,876,784 B2 11/2014 Cote, Sr. et al.
(Continued)

FOREIGN PATENT DOCUMENTS

CN 1158574 A 9/1997
CN 1796248 A 7/2006
(Continued)

OTHER PUBLICATIONS

Australian Office Action for Application No. 2022241460, dated Nov. 14, 2023, 3 pages.

(Continued)

*Primary Examiner* — Ariana Zimbouski
(74) *Attorney, Agent, or Firm* — MASCHOFF BRENNAN

(57) ABSTRACT

An exemplary vial adapter may include a moveable member, an elongated member with a first passage, a second passage coupled to an expandable first reservoir, and a third passage coupled to an expandable second reservoir. In a first orientation of an exemplary vial adapter, a fluid may be directed through the first passage into the first reservoir or the second reservoir. In a second orientation of an exemplary vial adapter, a fluid may be drawn through the first passage and a fluid drawn through an air passage into the second passage. In a second orientation of an exemplary vial adapter, a fluid may be directed through the first passage and through the third passage into the second reservoir. In a first orientation of an exemplary vial adapter, a moveable member may be activated to direct a fluid from the second reservoir through the third passage.

18 Claims, 9 Drawing Sheets

Related U.S. Application Data continuation of application No. 15/002,184, filed on Jan. 20, 2016, now Pat. No. 10,258,541.

(52) U.S. Cl.
CPC ............ *A61J 1/2037* (2015.05); *A61J 1/2072* (2015.05); *A61J 1/2075* (2015.05)

(56) References Cited

U.S. PATENT DOCUMENTS

| | | | | |
|---|---|---|---|---|
| 10,258,541 | B2 | 4/2019 | Cheng | |
| 11,154,458 | B2 * | 10/2021 | Cheng | A61J 1/2082 |
| 2005/0051579 | A1 | 3/2005 | Kasting | |
| 2007/0106244 | A1 | 5/2007 | Mosler | |
| 2008/0172024 | A1 | 7/2008 | Yow | |
| 2012/0172829 | A1 | 7/2012 | Hasegawa | |
| 2013/0228239 | A1 | 9/2013 | Cederschiold | |
| 2014/0238532 | A1 * | 8/2014 | Fangrow | A61J 1/2086 141/2 |
| 2015/0320641 | A1 * | 11/2015 | Fangrow | A61J 1/2096 137/799 |

FOREIGN PATENT DOCUMENTS

| | | | |
|---|---|---|---|
| CN | 101394881 | A | 3/2009 |
| CN | 101437463 | A | 5/2009 |
| CN | 102711712 | A | 10/2012 |
| CN | 102844568 | A | 12/2012 |
| CN | 207477700 | U | 6/2018 |
| JP | 2009514641 | A | 4/2009 |
| JP | 2014521491 | A | 8/2014 |
| WO | WO-2007101772 | A1 | 9/2007 |
| WO | WO-2008036101 | A2 | 3/2008 |
| WO | WO-2013025946 | A1 | 2/2013 |
| WO | WO-2014158724 | | 10/2014 |
| WO | WO-2014188407 | A1 | 11/2014 |
| WO | WO-2015009746 | | 1/2015 |

OTHER PUBLICATIONS

Chinese Office Action for Application No. 202011441819.3, dated Dec. 26, 2023, 7 pages including translation.
Extended European Search Report for Application No. 23190495.4, dated Oct. 27, 2023, 7 pages.
Australian Office Action for Application No. 2022241460, dated Apr. 4, 2024, 3 pages.
Australian Office Action for Application No. 2021203377, dated Feb. 10, 2022, 3 pages.
Japanese Office Action for Application No. 2022001863, dated Mar. 1, 2023, 4 pages including translation.
Canadian Office Action for Application No. 3011076, dated Jan. 26, 2023, 3 pages.
Australian Office Action for Application No. 2017208831, dated Nov. 23, 2020, 4 pages.
Chinese Office Action for Application No. 2017100341071, dated Feb. 25, 2020, 12 pages.
Extended European Search Report for Application No. 20154591.0, dated May 6, 2020, 7 pages.
International Search Report and Written Opinion for Application No. PCT/US2017/012380, dated Mar. 31, 2017, 14 pages.
Israel Office Action for Application No. 260302, dated Apr. 18, 2021, 6 pages.
Canadian Office Action for Application No. 3011076, dated Jan. 18, 2024, 3 pages.
Japanese Office Action for Application No. 2023-092025, dated Feb. 16, 2024, 7 pages including translation.
Japanese Office Action for Application No. 2022001863, dated Nov. 24, 2022, 7 pages including translation.

* cited by examiner

VIAL ADAPTER

CROSS-REFERENCE TO RELATED APPLICATIONS

This application is a continuation of application U.S. patent application Ser. No. 16/383,314, filed on Apr. 12, 2019, entitled "VIAL ADAPTER," which is a continuation of application U.S. patent application Ser. No. 15/002,184, filed on Jan. 20, 2016, now U.S. Pat. No. 10,258,541, entitled "VIAL ADAPTER," the disclosures of each of which are hereby incorporated by reference in their entirety for all purposes.

TECHNICAL FIELD

The present disclosure relates generally to medical connectors used in fluid transfer applications. More particular, it relates to a vial adapter for the transfer of fluids in medical settings without exposure of the fluid to an ambient atmosphere.

Medical connectors are widely used to transmit, prepare, and deliver medical fluids. The preparation of a medical fluid may include the delivery, dilution, reconstitution, and withdrawal of a medical fluid or a component thereof with a container such as a vial.

In some instances, such as with chemotherapy treatment, the medical fluid is hazardous. Particularly, repeated exposure to the medical fluid, such as by medical personnel, is hazardous. An example instance of medical fluid transfer is the reconstitution of a medication. Reconstitution is often conducted within a sealed vial containing a medical fluid, or a constituent thereof, in any state of matter. This process requires a diluent to be delivered into the vial. However, delivery of the diluent into the sealed vial causes displacement of gas within the vial. If the gas were permitted to enter the ambient atmosphere, people within the ambient atmosphere may be exposed to the gas. In some instances, the medical fluid itself may be transmitted into the ambient atmosphere during reconstitution.

SUMMARY

During the transfer of medical fluid between a container and a vial, a vial adapter is used to capture fluids displaced from the vial. During a transfer procedure, such as reconstitution, the sequence of steps requires the orientation of the vial to be changed one or more times (e.g., upright and inverted). The capture and return of displaced fluids during reconstitution requires additional changes in the vial's orientation, thereby increasing the number of required steps in the sequence.

An aspect of the present disclosure provides a vial adaptor for coupling with a vial, the vial adaptor comprising: a medical connector interface; an elongated member configured to extend into the vial upon coupling the vial adaptor with the vial; an expandable first reservoir; an expandable second reservoir; a first passage between the medical connector interface and the elongated member; a second passage between a chamber and the elongated member, the first reservoir coupled to the chamber through a first one-way valve that permits flow from the chamber into the first reservoir, and an air passage coupled to the chamber through a second one-way valve that permits flow from the air passage into the chamber; and a third passage between the second reservoir and the elongated member.

In some instances, the second passage comprises a valve. In some instances, the valve is orientation dependent. Some instances provide a filter between the chamber and the valve. In some embodiments, wherein the filter is hydrophobic. In some implementations, the second reservoir is resilient. Some embodiments provide a moveable member configured to direct a fluid from the second reservoir.

Some instances of the present disclosure provide a housing. Some instances provide a housing vent configured to couple an inner portion of the housing with an ambient environment. In some embodiments, the air passage is fluidly coupled to the inner portion of the housing comprising the housing vent.

Certain implementations of the present disclosure provide, a method for communicating fluid through a vial adaptor, the method comprising: coupling a medical connector to a vial using a vial adaptor having an expandable first reservoir and an expandable second reservoir; directing fluid from a medical connector into a vial when the vial adaptor is in a first orientation where the vial adaptor is in fluid communication with a gas in the vial, permitting the gas displaced from the vial to enter the first reservoir, and permitting a liquid displaced from the vial to enter the second reservoir; drawing a liquid from the vial into the medical connector when the vial adaptor is in a second orientation, opposite the first orientation, where the vial adaptor is in fluid communication with the liquid in the vial, and permitting a gas to be drawn from an ambient environment through an air passage of the vial adaptor into the vial; and directing a liquid from the medical connector into the vial when the vial adaptor is in the second orientation, and permitting a liquid displaced from the vial to enter the second reservoir.

Some embodiments of the present disclosure provide directing the fluid from the second reservoir into the vial when the vial adaptor is in the first orientation. Some embodiments provide directing the fluid from the second reservoir into the vial comprises compressing the second reservoir. Some instances of the present disclosure provide obstructing a fluid flow between the first reservoir and the vial when the vial adaptor is in the second orientation. Some instances provide obstructing a fluid flow from the vial to the air passage when the vial adaptor is in the second orientation. Certain embodiments of the present disclosure provide filtering a gas drawn through the air passage. Some instances provide permitting a fluid to be drawn from the second reservoir into the vial when the vial adaptor is in the second orientation.

An aspect of the present disclosure provides a vial adaptor for coupling with a vial, the vial adaptor comprising: an expandable first reservoir and a first one-way valve that permits a fluid into the first reservoir when the vial adaptor is in a first orientation; and an expandable second reservoir that permits a fluid into the first reservoir when the vial adaptor is in a second orientation, opposite the first orientation; wherein vial adaptor is configured to direct the fluid out of the second reservoir when the vial adaptor is in the first orientation and the second orientation.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

DETAILED DESCRIPTION

In the following detailed description, specific details are set forth to provide an understanding of the subject technology. It will be apparent, however, to one ordinarily skilled in the art that the subject technology may be practiced without some of these specific details. In other instances, well-known structures and techniques have not been shown in detail so as not to obscure the subject technology.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such "an embodiment" may refer to one or more embodiments and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

FIGS. 1-8 illustrates embodiment of a vial adapter configured to capture, retain, and return a medical fluid displaced from a container, for example, a sealed vial. The vial adapter may be coupled with a vial and a medical connector, permitting fluids to be transferred through, captured, or directed from the vial adapter. Specifically, fluids may be captured or directed through one or more reservoir or passage of the vial adapter.

The term "vial" as used herein, refers to any container that may retain a fluid therein. The term "fluid" as used herein, refers to any liquid, gas, or combination thereof.

Figure 1:
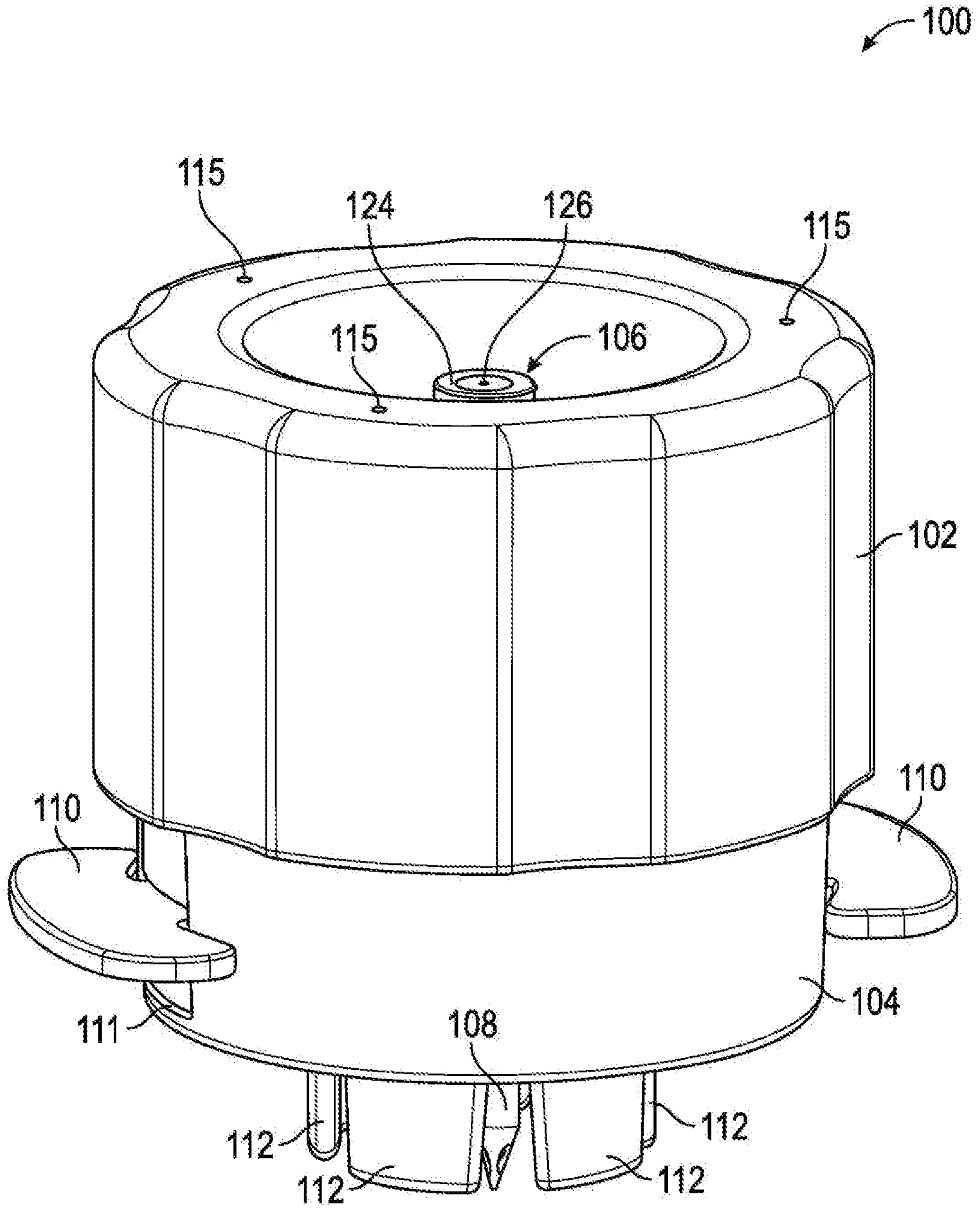
FIG. 1 illustrates a perspective side view of a vial adapter in accordance with aspects of the present disclosure.
Figure 2:
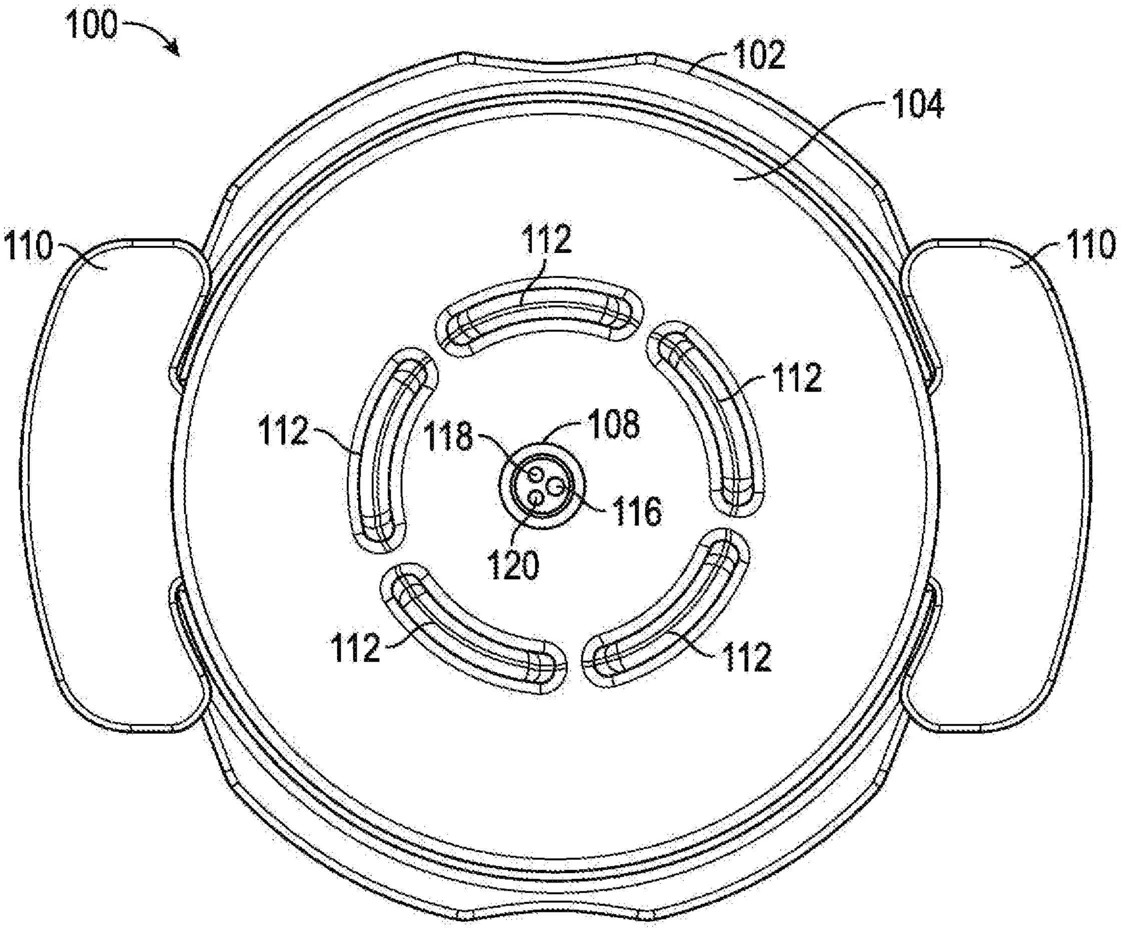
FIG. 2 illustrates bottom view of the vial adapter depicted in FIG. 1.

FIGS. 1-2 illustrate an embodiment of a vial adapter 100. In some embodiments, the vial adapter 100 comprises an upper housing 102 and a lower housing 104. In some embodiments, the lower housing 104 is seated in a rim of the upper housing 102. In yet another embodiment, an intermediate plate 122 (FIG. 3) is seated in the rim of the upper housing 102, between the upper housing 102 and the lower housing 104. The upper housing 102 includes a medical connector interface 106, and the lower housing 100 includes an elongated member 108. In some embodiments, the vial adapter 100 includes a movable member 110. A portion of the movable member 110 protrudes from the housing to permit a user to engage and activate the movable member 110. In an embodiment, portions of the movable member 110 protrude through opposing walls of the lower housing 104. In some instances, the elongated member 108 and a retainer 112 may protrude from the lower housing 104.

Referring to the bottom view of the vial adapter 100 in FIG. 2, an embodiment of the elongated member 108 further includes a first passage 116, a second passage 118, and a third passage 120 extending axially through the elongated member 108. In an embodiment, the retainer 112, illustrated comprising a plurality of arcuate protrusions that surround the elongated member 108. In an embodiment, the vial adapter 100 is configured to couple with a vial 902 (FIG. 3) so that a fluid may flow between the vial adapter 100 and the vial through the first passage 116, second passage 118, and third passage 120. In the embodiment illustrated, a vial 902 may be coupled with the lower housing 104, and a medical connector 950 (FIG. 3) may be coupled with the upper housing 102.

When coupled with a vial 902, the elongated member 108 extends into an inner portion 903 of the vial 902. During coupling, a connector portion 904 of the vial 902 is inserted between the retainers 112 so that the elongated member 108 extends through an opening, port, or septum of the vial 902, and the first passage 116, second passage 118, and third passage 120 are fluidly coupled with the inner portion of the vial 902. In some embodiments, the retainers 112 have an inner surface with a cross-sectional length that is equal to or slightly less than a cross-sectional length of the outer surface of the vial to provide coupling between the vial adapter 100 and a vial 902 by friction or an interference fit. In other embodiments, a retainer 112 may include threads or latches configured to mate with a vial 902. One or more passage extends through the housing to permit the exchange of a gas between an inner portion of the housing and the ambient atmosphere outside of the vial adapter 100. For example, in some aspects, one or more housing vent 114 extends through the upper housing 102 to permit a gas flow between the ambient atmosphere and the lower housing 104. For example, in some aspects, one or more housing vent 115 extends through the upper housing 102 to permit a gas flow between the ambient atmosphere and the upper housing 102.

Figure 3:
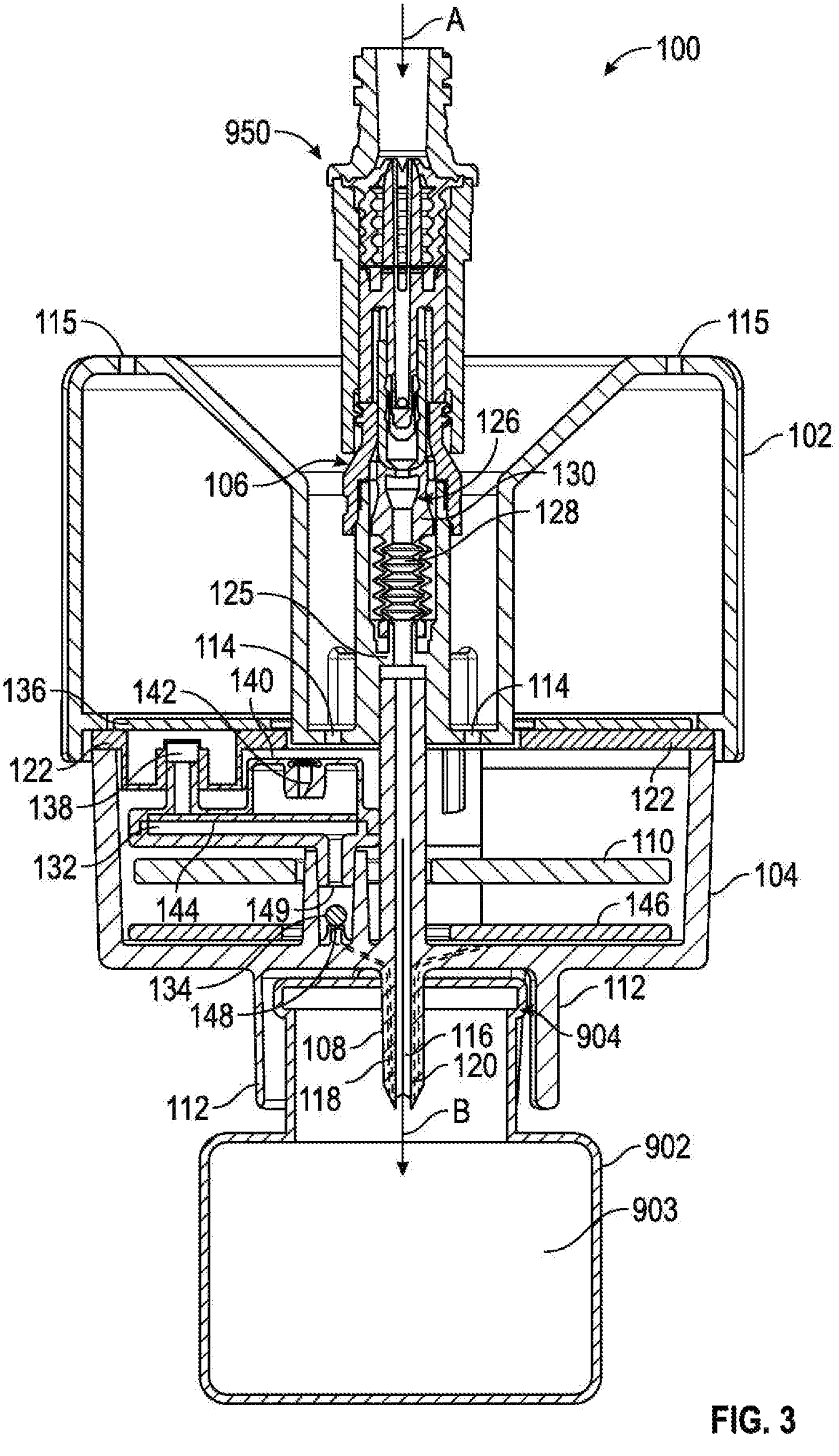
FIG. 3 illustrates a cross-sectional plan view of a vial adapter in accordance with aspects of the present disclosure.

Referring to the embodiment of FIG. 3, a medical connector interface 106 protrudes from the upper housing 102, and is configured to couple with a medical connector 950. For example, the medical connector interface 106 may be coupled with a syringe or needleless access device 950. In some embodiments, the medical connector interface 106 includes a port 124 and a cavity between the port 124 and a cavity inlet 125. In an embodiment, the cavity inlet 125 extends radially inward from an inner surface of the cavity to separate the first passage 116 from the cavity to form an orifice or lumen that fluidly connects the cavity to the first passage 116. A resilient valve member 126 extends within the cavity from the cavity inlet 125 toward the port 124. The cavity comprises a wider inner cross-sectional length than the port 124. The resilient valve member 126 includes a head 130 and bellows portion 128 having an internal passage. The port 124 and cavity are fluidly coupled to the cavity inlet 125 through the internal passage of the head 130 and bellows portion 128. In an extended orientation (FIGS. 1 and 4), the bellows portion 128 is extended so that the head 130 extends into the port 124 to close the internal passage of the head 130 and obstruct the port 124. In some embodiments, the internal passage of the head 130 is opened during coupling of a medical connector 950 with the medical connector interface 106. In a retracted configuration (FIG. 3), the bellows portion 128 and head 130 are biased into the cavity toward the cavity inlet 125 to open the internal passage of the head 130 and the port 124. For example, an axial force is applied against the head 130 to axially compress the resilient valve member 126 to urge the head 130 into the cavity portion. Within the cavity, the head 130 radially expands to fluidly couple the port 124, internal passage through the head 130 and bellows portion 128, and the orifice of the cavity inlet 125.

The first passage 116 preferably extends through the elongated member 108 and lower housing 104 to fluidly couple with the cavity inlet 125 of the medical connector interface 106. In an embodiment, the second passage 118 is configured to couple with a first reservoir 136 and an air passage 140. In some embodiments, the second passage 118 extends through the elongated member 108 and lower housing 104 into a chamber 132. In some embodiments, the second passage 118 includes a valve 134 between the chamber 132 and the elongated member 108. In some aspects, the chamber 132 is coupled between the valve 134 and the intermediate plate 122.

In an embodiment, the valve 134 includes a first port 148 between the elongated member 108 and the valve 134, and a second port 149 between the chamber 132 and the valve 134. In some aspects, the valve 134 includes a movable part configured to block the second port 149. In an embodiment, the valve 134 is a ball check valve where the movable part is a spherical ball. The first port 148 includes features that permit fluid flow through the first port 148, from the valve 134 to the second passage 118, when the ball check valve is engaged against the first port 148. In some aspects, the first port includes one or more projection (FIG. 6) that extends toward the second port 149. The one or more projections are spaced apart or include apertures such that fluid flow is not obstructed when the ball check valve is engaged against the first port 148. Thus, when the vial adapter 100 is in a first orientation, illustrated in FIG. 3, the spherical ball engages against the seat of the first port 148, and fluid flow is permitted from the chamber 132 to the elongated member 108. As will be discussed later, when the vial adapter 100 is in a second orientation illustrated in FIG. 5, the spherical ball rests in the seat of the second port, thereby blocking a fluid flow from the elongated member 108 to the chamber 132.

The vial adapter 100 includes one or more fluid reservoir. In some instances, a fluid reservoir is rigid or comprises a flexible material that yields or expands as the reservoir receives a fluid. The reservoir may include pleats, bellows, corrugations, or other features that permit the reservoir to expand. In an embodiment, the fluid reservoir comprises a resilient material that expands as the reservoir receives a fluid, and retracts to a neutral state as the fluid is withdrawn or directed out of the fluid reservoir. The vial adapter 100 may also comprise one or more one-way valve, limiting a fluid flow in a single direction. In some instances, the one-way valve is a duck-billed, umbrella, or similar type valve.

In some embodiments, the first reservoir 136 is fluidly coupled to the second passage 118 through the chamber 132. In an embodiment, the first reservoir 136 is within the housing, and in some aspects, is coupled to the intermediate plate 122 on a surface facing the inner portion of the upper housing 102. Thus, the first reservoir 136 is permitted to expand into the upper housing 102 upon receiving a fluid from the chamber 132. In some embodiments, the first reservoir 136 is ring-shaped and extends around the medical connector interface 106 within the upper housing 102. A first one-way valve 138 permits a fluid flow into the first reservoir 136. In some embodiments, the first one-way valve 138 is coupled between the chamber 132 and the first reservoir 136. In an embodiment, the first one-way valve 138 is coupled between the chamber 132 and the intermediate plate 122 such that fluid flows from the chamber 132, through the first one-way valve 138 and intermediate plate 122, into the first reservoir 136. In some instances, where the first reservoir 136 is not resilient, the first reservoir 136 is fluidly coupled to the chamber 132 or second passage 118 without a valve.

The chamber 132 also preferably includes an air passage 140. In some embodiments, the air passage 140 extends through a wall of the chamber 132 and includes a second one-way valve 142. The second one-way valve 142 is configured to permit a fluid into the chamber 132 through the air passage 140. In an embodiment, a fluid is permitted to flow from the inner portion of the housing into the chamber 132. In some aspects, the fluid is a gas from an ambient atmosphere that is permitted to enter the lower housing 104 through the housing vent 114. In some aspects, the gas is permitted to enter the lower housing 104 through the windows 111.

Figure 6:
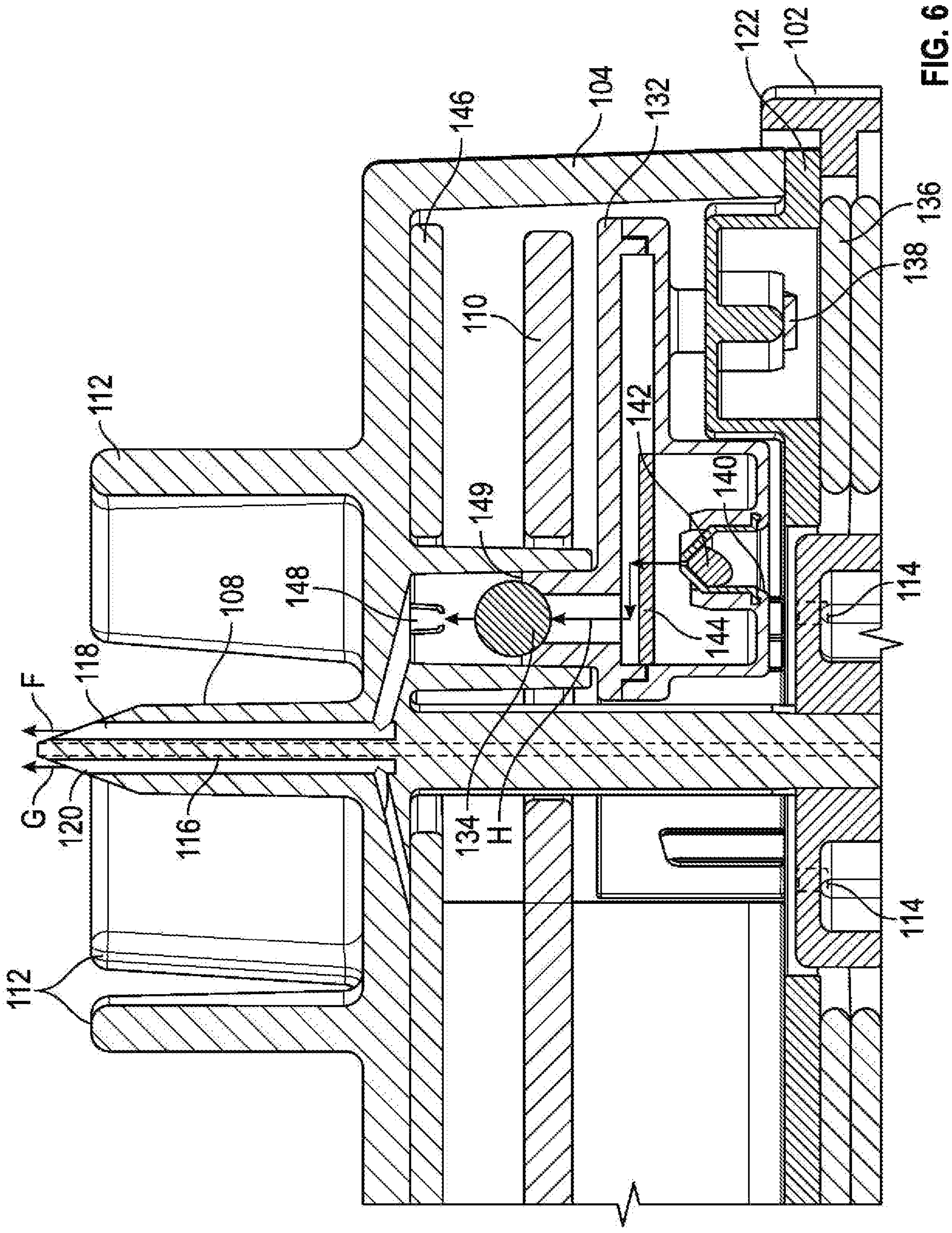
FIG. 6 illustrates a detail plan view of the vial adapter depicted in FIG. 5.

In some embodiments, the vial adapter 100 may include a filter 144 configured to filter gases from the ambient atmosphere entering a vial through the vial adapter 100. In some aspects, the filter 144 is configured to separate particulates from a gas entering the second passage 118. In an embodiment, the filter 144 is coupled with the air passage 140 of the chamber 132. In some embodiments, the filter 144 is between the first reservoir 136 and the air passage 140, and the valve 134. In some embodiments, the filter 144 is within the chamber 132, between the first one-way valve 138 and the second one-way valve 140, and the valve 134. In an embodiment, the filter 144 is within the chamber 132, between the second one-way valve 142 and the valve 134 (FIG. 6). In some aspects, the filter 144 is a hydrophobic-type filter.

The third passage 120 is configured to couple with a second reservoir 146. In some embodiments, the third passage 120 extends through the elongated member 108 and the lower housing 104 to fluidly couple with a second reservoir 146. In some embodiments, the second reservoir 146 is within the housing, and in some aspects, is coupled to an inner surface of the lower housing 104. Thus, the second reservoir 146 is permitted to expand toward the upper housing 102 upon receiving the fluid from the third passage 120. In some embodiments, the second reservoir 146 is ring-shaped and extends around the first passage 116 in the lower housing 104.

As the second reservoir 146 expands or is compressed, gasses are displaced from or drawn into the lower housing 104. Vents 114 permit a gas flow between the ambient atmosphere and the lower housing 104. In some embodiments, the intermediate plate 122 is spaced apart from the upper housing 102 to permit gas flow between the upper housing 102 and lower housing 104, thereby permitting gas flow through vents 114. In some embodiments, gas flow is permitted between the ambient atmosphere and the lower housing 104 through windows 111.

The vial adapter 100, in some embodiments, includes a movable member 110 configured to direct a fluid from the second reservoir 146. In an embodiment, the movable member 110 is retained within the vial adapter 100 and configured to compress the second reservoir 146. For example, a ring-shaped movable member 110 is coupled to the lower housing 104 with the second reservoir 146 between the movable member 110 and the inner surface of the lower housing 104. Some aspects of the movable member 110 include fingers or tabs that protrude to outside of the housing. In some embodiments, the fingers or tabs extend through windows 111 of the lower housing 104 (FIG. 1). In some respects, the movable member 110 is activated by biasing the tabs to shift the movable member 110, and thereby compress the second reservoir 146. In other embodiments, the movable member 110 may comprise a ratcheting mechanism, a spring, or threaded portions to pivot or shift the movable member 100 rotationally and/or axially. In some embodiments, the movable member 110 is activated upon decoupling a medical connector 950 from the vial adapter 100.

The following description is directed to an embodiment of a vial adapter 100 with reference to reconstitution, withdrawal, and return of a medical fluid. However, the present disclosure may be carried out using some or all of the foregoing processes including, but not limited to, withdrawal, dilution, reconstitution, delivery, or transfer of a medical fluid. For example, the vial adapter 100 may be used to withdrawal and then return a portion of medical fluid.

Figure 4:
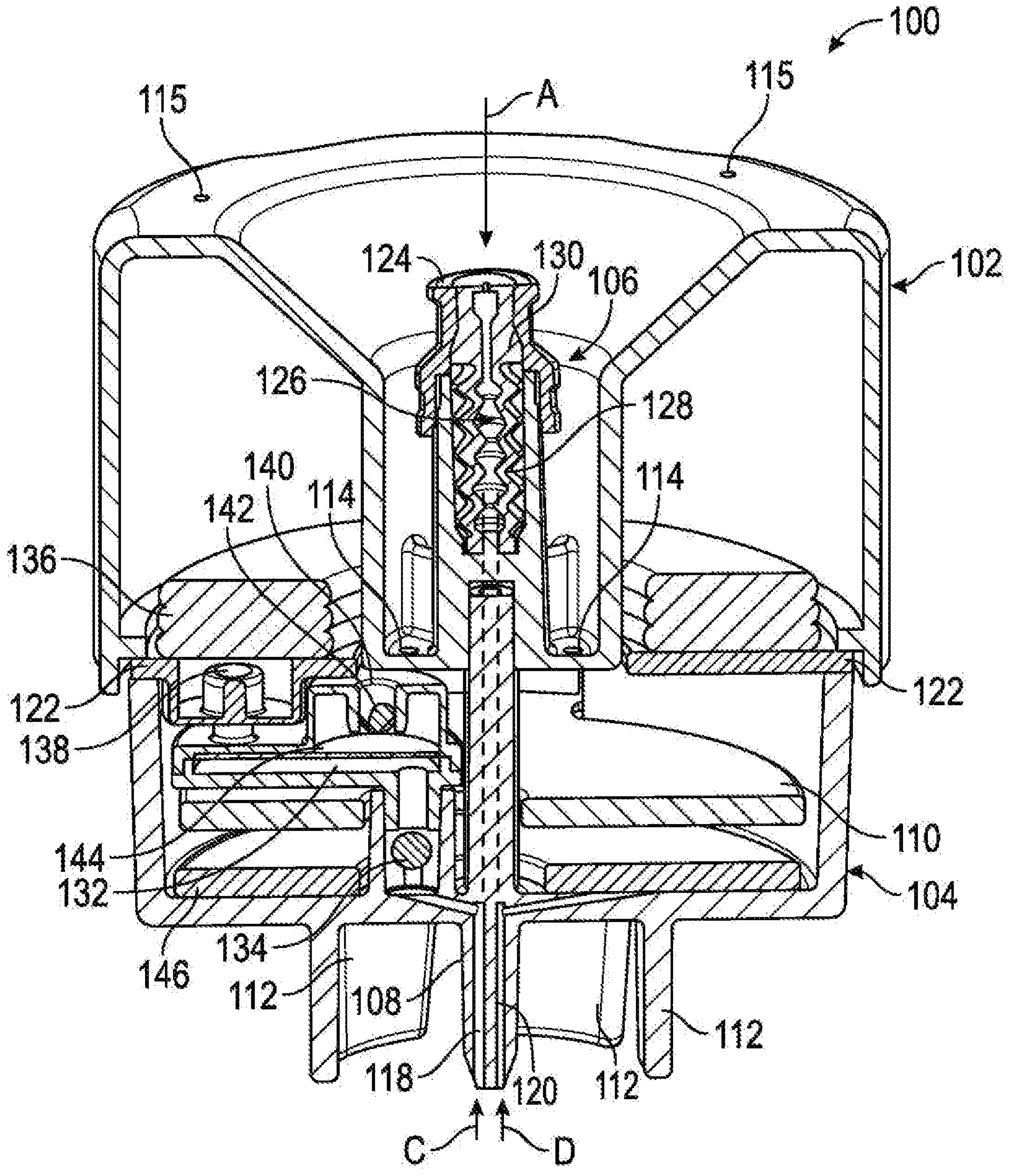
FIG. 4 illustrates a cross-sectional perspective view of a vial adapter in accordance with aspects of the present disclosure.

Referring to FIGS. 3-4, in some embodiments, a fluid is directed from the medical connector interface 106 to the elongated member 108 when the vial adapter 100 is placed in a first orientation. In an embodiment, a sealed vial 902 (FIG. 3) is coupled to the elongated member 108 and a medical connector 950 (FIG. 3) is coupled to the medical connector interface 106. In the first orientation, the elongated member 108 is in fluid communication with the gas contents of the vial. The resilient valve member 126 is biased by the medical connector as illustrated in FIG. 3, and a diluent or other liquid is directed from the medical connector into the medical connector interface 106, as illustrated by Arrow A. The diluent is transmitted through the first passage 116, and out of the elongated member 108 to the vial, as illustrated by Arrow B. In some embodiments, the diluent enters the inner portion of the vial from the first passage 116, the pressure within the vial increases. Increasing pressure within the vial causes the fluid contents of the vial in communication with the elongated member 108 to be directed into the second passage 118 and the third passage 120 as illustrated by Arrows C and D, respectively. In some aspects, the fluid directed into the second passage 118 and third passage 120 is a gas when the vial adapter 100 is in the first orientation.

In an embodiment, the spherical ball of the valve 134 engages the first port 148 in the first orientation. In the first orientation, a fluid directed through the valve 134 toward the elongated member 108 is permitted through the first port 148. In some aspects, a fluid directed from the elongated member 108 toward the valve 134 displaces the spherical ball from the first port 148, thereby permitting the fluid to pass through the valve 134. In some embodiments, the fluid passes through the valve 134 into the chamber 132.

In the first orientation, a fluid displaced from the vial is permitted through the second passage 118 and the valve 134, into the chamber 132. In some aspects, when the vial adapter 100 is in the first orientation, the fluid is a gas. Within the chamber 132, the gas is permitted to pass through the first one-way valve 138 into, and expand, the first reservoir 136. As the first reservoir 136 expands or is compressed, gasses are displaced from or drawn into the upper housing 102. Vents 115 permit a gas flow between the ambient atmosphere and the upper housing 102. In some embodiments, the intermediate plate 122 is spaced apart from the upper housing 102 to permit gas flow between the upper housing 102 and lower housing 104, thereby permitting gas flow through vents 114 or windows 111. The second one-way valve 142 coupled to the air passage 140 does not permit a fluid, including the gas, to enter the ambient atmosphere. The fluid displaced from the vial is also permitted through the third passage 120 into the second reservoir 146, causing expansion of the second reservoir 146. In some instances, the movable member 110 may be activated to direct the fluid from the second reservoir 146 into the vial.

Figure 5:
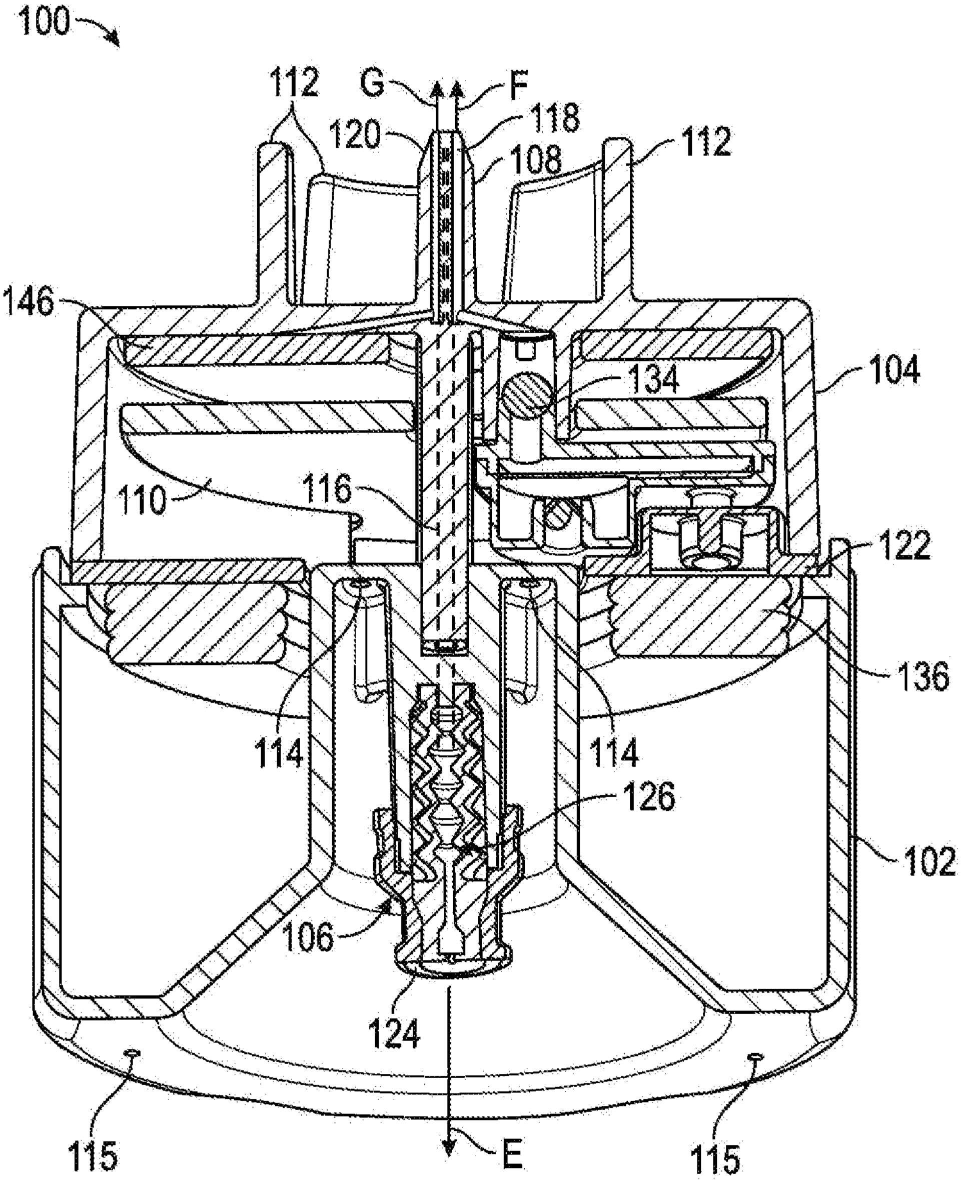
FIG. 5 illustrates a cross-sectional perspective view of a vial adapter in accordance with aspects of the present disclosure.

Referring to FIGS. 5-6, in some embodiments, the vial adapter 100 is placed in a second orientation to direct a fluid from the elongated member 108 to the medical connector interface 106. In an embodiment, a sealed vial 902 (FIG. 3) is coupled to the elongated member 108 and a medical connector 950 (FIG. 3) is coupled to the medical connector interface 106. In some embodiments, the vial adapter 100 is placed in the second orientation after a diluent is directed into a vial in the first orientation to reconstitute a medication. In some embodiments, for example, where reconstitution is not occurring, the vial adapter 100 is placed in the second orientation to withdraw a fluid from a vial. In the second orientation, the elongated member 108 is in fluid communication with a liquid content of the vial. The resilient valve member 126 is biased by the medical connector, and a liquid is withdrawn from the vial through the first passage 116 to the medical connector interface 106, as illustrated by Arrow E. The fluid is transmitted through the medical connector interface 106 into the medical connector. As the fluid is withdrawn from the vial, a vacuum or negative pressure is created within the vial. Due to a negative pressure, fluid is drawn from the second passage 118 and the third passage 120 into the vial, as illustrated by Arrows F and G, respectively.

In an embodiment, the spherical ball of the valve 134 engages the second port 149 when the vial adapter 100 is in the second orientation. In the second orientation, fluid directed through the valve 134 toward the elongated member 108 displaces spherical ball from the second port 149, thereby permitting the fluid to pass through the valve 134 (Arrow H).

In the second orientation, a fluid from within the housing (i.e., gases from the ambient atmosphere) are drawn through the air passage 140, the second one-way valve 142, and the second passage 118 into the vial. In some embodiments, the gas passes through the filter 144 before entering the vial. In some aspects, the filter 144 is seated within the chamber 132, between the second one-way valve 142 and the valve 134. The first one-way valve 138 does not permit a fluid to enter the second passage 118 from the first reservoir 136. In some aspects, a fluid from within the second reservoir 146 is also drawn into the vial through the third passage 120.

Figure 7:
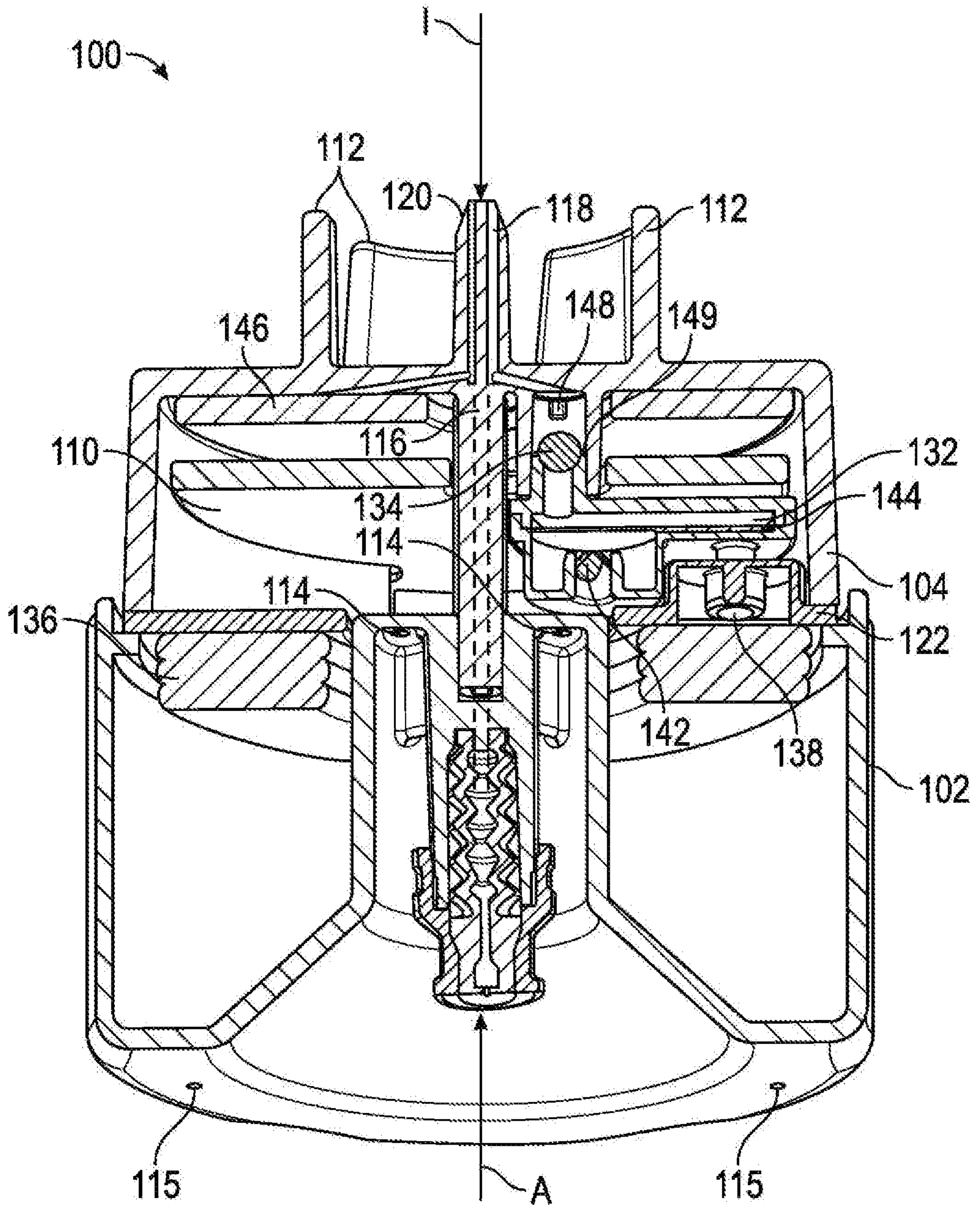
FIG. 7 illustrates a cross-sectional perspective view of a vial adapter in accordance with aspects of the present disclosure.

Referring to FIG. 7, in some embodiments, a fluid is directed from the medical connector interface 106 to the elongated member 108 when the vial adapter 100 is in the second orientation. In embodiments where a vial and medical connector are coupled to the vial adapter 100, the fluid is directed from the medical connector to the vial. In some embodiments, while the vial adapter 100 is in the second orientation, a fluid that was withdrawn from the vial into the medical connector (i.e. FIGS. 5-6) is returned to the vial (FIG. 7) while the vial adapter 100 is in the second orientation. With the resilient valve member 126 biased by the medical connector, the fluid is directed from the medical connector into the medical connector interface 106, as illustrated by Arrow A. The fluid is transmitted through the first passage 116, into the vial. As the fluid enters the vial from the first passage 116, the pressure within the vial increases. Increasing pressure within the vial causes the fluid contents of the vial, in communication with the elongated member 108, to be directed into the third passage 120 as illustrated by Arrow I. The fluid is directed through the third passage 120 to enter into, and expand, the second reservoir 146. While in the second orientation, the movable member 110 may be activated to direct the fluid from the second reservoir 146 into the vial.

In an embodiment, the spherical ball of the valve 134 engages and seals the second port 149 in the second orientation. Any fluid directed through the elongated member 108 to the valve 134 urges the spherical ball against the second port 149, thereby obstructing the fluid passage from the second passage 118 through the valve 134.

Figure 8:
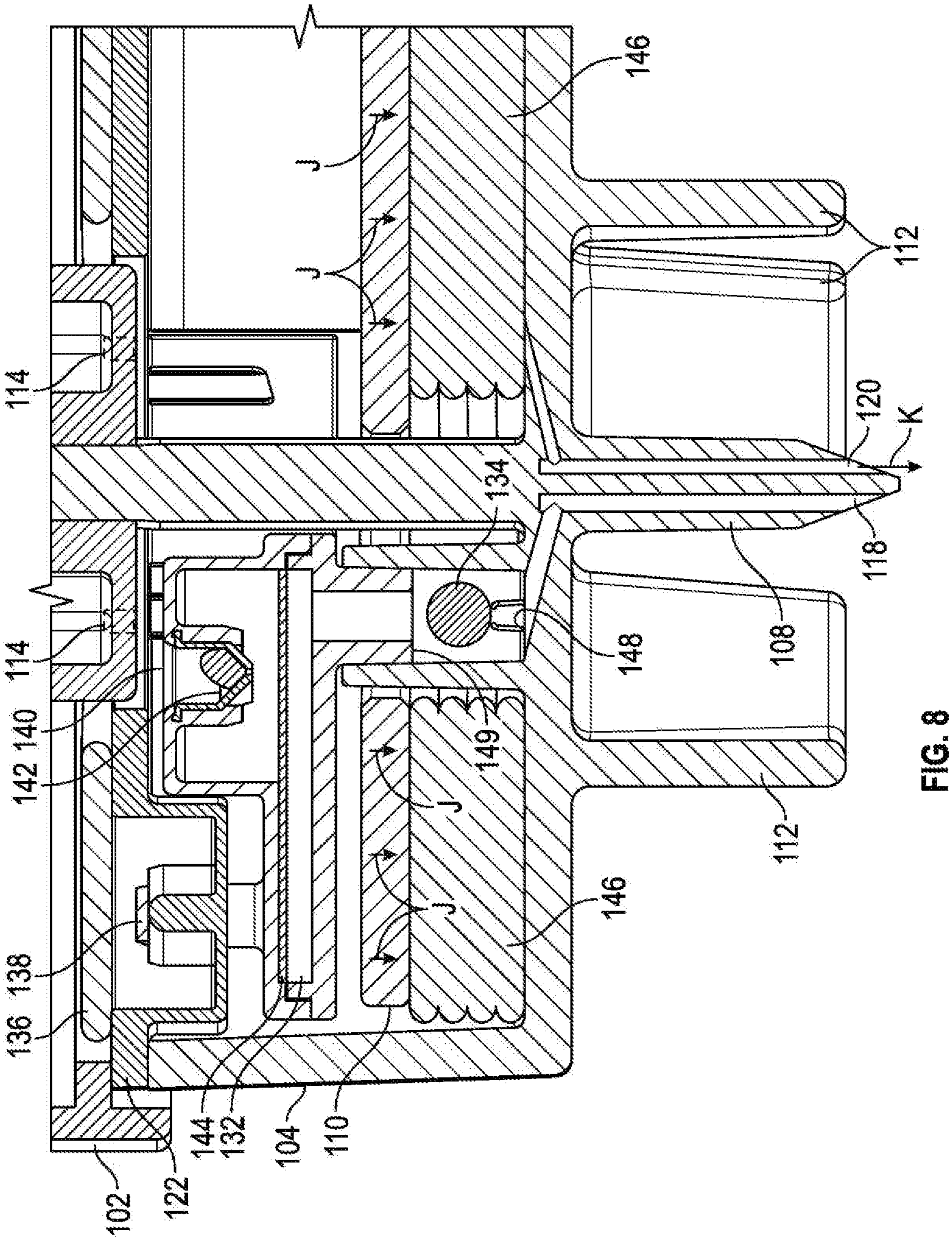
FIG. 8 illustrates a detail plan view of a vial adapter in accordance with aspects of the present disclosure.

Referring to FIG. 8, in some embodiments, a fluid is directed from the second reservoir 146 to the elongated member 108 when the vial adapter 100 is in the first orientation. In embodiments where a vial 902 (FIG. 3) is coupled to the vial adapter 100, the fluid is directed from the second reservoir 146 to the vial. In some instances, the fluid within the second reservoir 146, was previously directed from the vial to the second reservoir 146 when the vial adapter 100 was in the second orientation. To direct, or return, the fluid from the second reservoir 146 to the vial, the vial adapter 100 is placed in the first orientation so that the elongated member 108 is in fluid communication with the gas contents of the vial. The movable member 110 is activated, for example by urging the tabs towards the vial, to engage the movable member 110 against second reservoir 146 (Arrow J). In some embodiments, the second reservoir 146 is compressed between the movable member 110 and a surface of the lower housing 104. As the second reservoir 146 is compressed, the fluid therein is directed through the third passage 120, out of the elongated member 108, and into the vial (Arrow K).

In some embodiments, the fluid entering the vial displaces another fluid from within the vial. The displaced fluid is permitted through the second passage 118 and the valve 134, into the chamber 132. In some aspects, when the vial adapter 100 is in the first orientation, the displaced fluid is a gas. Within the chamber 132, the gasses are permitted to pass through the first one-way valve 138 into, and expand, the first reservoir 136. The second one-way valve 142 coupled to the air passage 140 does not permit a fluid, including the gas, to enter the ambient atmosphere.

Figure 9:
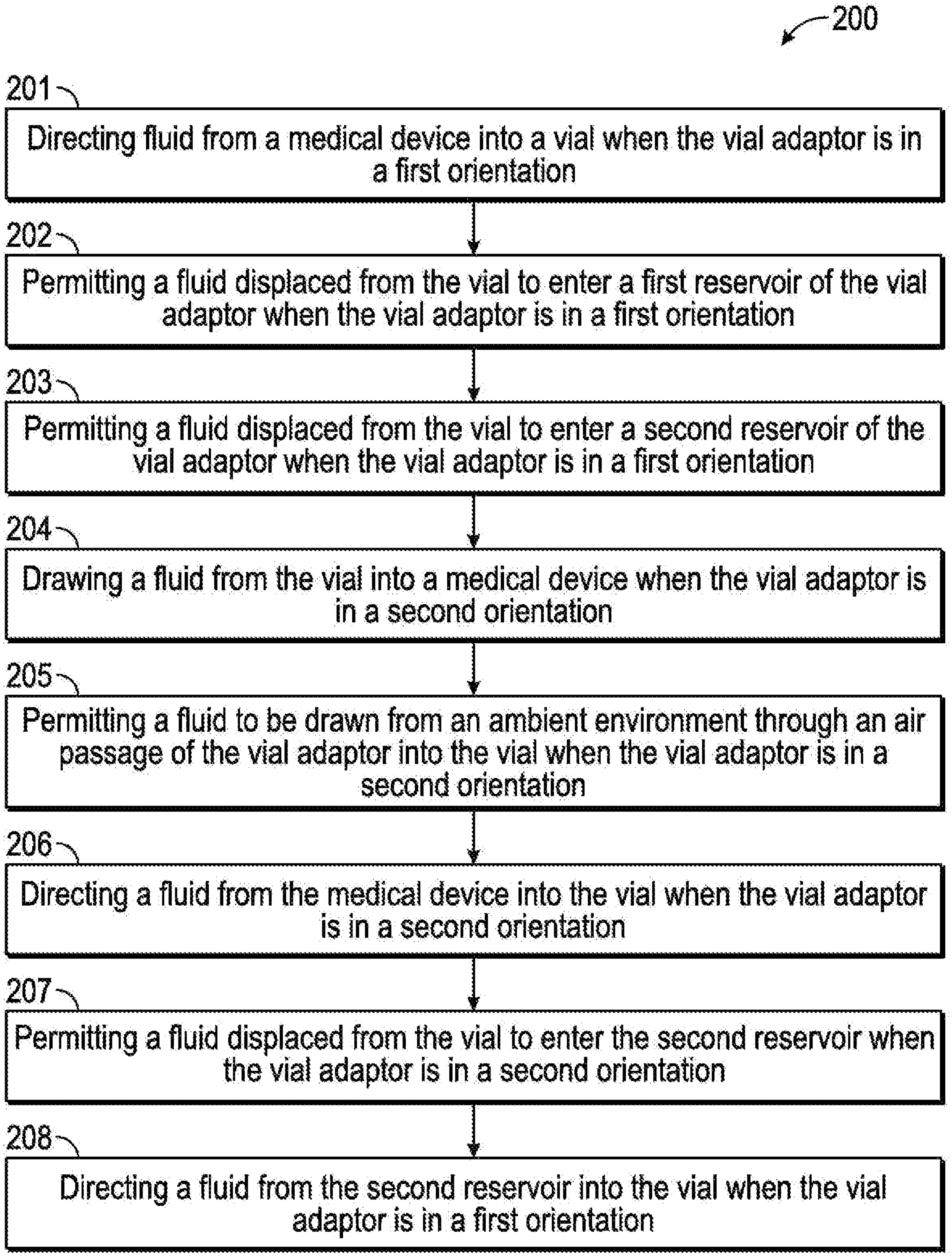
FIG. 9 is a flow chart of an example method of using a vial adapter in accordance with aspects of the present disclosure.

FIG. 9 is a flow chart of an example method related to communicating fluid through a vial adaptor. It is to be understood that the operations in method 200 may be used in conjunction with other methods and aspects of the present disclosure. Although aspects of method 200 are described with relation to the examples provided in FIGS. 1-8, the process 200 is not limited to such.

In block 201, a fluid is directed from a medical connector into a vial when the vial adaptor is in a first orientation. For example, with reference to FIG. 3, a diluent or other liquid is directed from the medical connector into the medical connector interface 106 (Arrow A). The fluid is transmitted through the first passage 116 into the vial (Arrow B).

In block 202, a fluid displaced from the vial is permitted to enter a first reservoir of the vial adapter. In block 203, a fluid displaced from the vial is permitted to enter a second reservoir of the vial adapter. For example, with reference to FIG. 4, a fluid is permitted to pass through the first one-way valve 138 into the first reservoir 136, and a fluid is permitted to pass through the third passage 120 into the second reservoir 146, thereby expanding each reservoir, 136 and 146, respectively.

In block 204, a fluid is drawn from the vial to the medical connector when the vial adapter is in a second orientation. For example, with reference to FIG. 5, a liquid is withdrawn from the vial through the first passage 116 to the medical connector interface 106 (Arrow E).

In block 205, a gas is drawn from an ambient environment through an air passage of the vial adaptor into the vial. For example, with reference to FIG. 6, a gas is drawn from the ambient atmosphere into the housing through the vent 114. The gas is then drawn from within the housing through the air passage 140, the second one-way valve 142, a filter 144, and the second passage 118 into the vial.

In block 206, a fluid is directed from the medical connector into the vial when the vial adaptor is in a second orientation. For example, with reference to FIG. 7, a liquid is directed from the medical connector interface 106, through the elongated member 108, and into a vial (Arrow A).

In block 207, a fluid displaced from the vial is permitted to enter the second reservoir of the vial adapter. For example, with reference to FIG. 7, a liquid is directed through the third passage 120 to enter into, and expand, the second reservoir 146 (Arrow I).

In block 208, a fluid is directed from the second reservoir into the vial when the vial adaptor is in a first orientation. For example, with reference to FIG. 8, a movable member 110 is displaced to compress the second reservoir 146 between the movable member 110 and a surface of the lower housing 104 (Arrow J). A liquid from within the second reservoir 146 is thereby displaced through the third passage 120, out of the elongated member 108, and into the vial (Arrow K).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While certain aspects and embodiments of the subject technology have been described, these have been presented by way of example only, and are not intended to limit the scope of the subject technology. Indeed, the novel methods and systems described herein may be embodied in a variety of other forms without departing from the spirit thereof. The accompanying claims and their equivalents are intended to cover such forms or modifications as would fall within the scope and spirit of the subject technology.

What is claimed is:

1. A vial adaptor for coupling with a vial, the vial adaptor comprising:

a medical connector interface, a vial interface, an expandable first reservoir, an expandable second reservoir, and a first passage extending from the medical connector interface through the vial interface; the first reservoir comprising a second passage extending through the vial interface and a first valve, wherein the first valve permits movement of a fluid into the first reservoir when the vial adaptor is in an upright orientation, and resists movement of a fluid into the first reservoir when the vial adaptor is moved toward an inverted orientation; and the second reservoir comprising a third passage extending through the vial interface to permit a fluid into the second reservoir when the vial adaptor is in the inverted orientation.

2. The vial adaptor of claim 1, wherein the third passage is fluidly separated from the first passage.

3. The vial adaptor of claim 1, further comprising a moveable member configured to engage against the second reservoir to direct a fluid out of the second reservoir.

4. The vial adaptor of claim 1, wherein the second passage comprises a second valve.

5. The vial adaptor of claim 1, further comprising a hydrophobic filter positioned in the second passage, between the expandable first reservoir and the vial interface.

6. The vial adaptor of claim 1, wherein the third passage permits a fluid to move out of the second reservoir when the vial adaptor is in the upright orientation and the inverted orientation.

7. A method for communicating fluid through a vial adaptor, the method comprising:

coupling a medical connector to a vial using a vial adaptor having an expandable first reservoir and an expandable second reservoir;

directing fluid from a medical connector, through a first passage of the vial adaptor, and into a vial when the vial adaptor is in an upright orientation where the vial adaptor is in fluid communication with a gas in the vial, permitting the gas displaced from the vial to move through a second passage of the vial adaptor and enter the first reservoir, and permitting a fluid displaced from the vial to move through a third passage of the vial adaptor and enter the second reservoir;

moving the vial adaptor toward an inverted orientation such that the vial adaptor is in fluid communication with the fluid in the vial, a first valve resists movement of a fluid into the first reservoir, and a second valve permits movement of the fluid into the second reservoir; and drawing a fluid from the vial, through the first passage, and into the medical connector when the vial adaptor is in the inverted orientation.

8. The method of claim 7, further comprising directing a fluid from the medical connector into the vial when the vial adaptor is in the inverted orientation, and permitting a fluid displaced from the vial to enter the second reservoir.

9. The method of claim 7, further comprising directing the fluid from the second reservoir into the vial when the vial adaptor is in the inverted orientation.

10. The method of claim 9, wherein directing the fluid from the second reservoir into the vial comprises compressing the second reservoir.

11. The method of claim 7, further comprising obstructing a fluid flow between the first reservoir and the vial when the vial adaptor is in the inverted orientation.

12. The method of claim 7, further comprising obstructing a fluid flow from the vial to an air passage when the vial adaptor is in the inverted orientation.

13. The method of claim 7, wherein permitting the gas displaced from the vial to enter the first reservoir comprises filtering a fluid moving from the vial to the first reservoir using a hydrophobic filter.

14. The method of claim 7, further comprising permitting a gas to be drawn from an ambient environment through an air passage of the vial adaptor into the vial.

15. A vial adaptor for coupling with a vial, the vial adaptor comprising a medical connector interface, a vial interface, a first passage extending between the medical connector interface and the vial interface, a second passage extending between the vial interface and an expandable first reservoir, and a third passage extending between the vial interface and an expandable second reservoir, wherein, when the vial adaptor is in an upright orientation, a valve of the second passage permits movement of a fluid between the vial interface and the first reservoir, and when the vial adaptor is moved toward an inverted orientation, the valve resists movement of a fluid into the first reservoir and the third passage permits movement of the fluid into the expandable second reservoir.

16. The vial adaptor of claim 15, wherein the third passage permits movement of a fluid into the expandable second reservoir when the vial adaptor is in the upright orientation.

17. The vial adaptor of claim 15, wherein the third passage is fluidly separated from the first passage.

18. The vial adaptor of claim 15, further comprising a hydrophobic filter positioned in the second passage, between the expandable first reservoir and the vial interface.

* * * * *